Feb. 21, 1967  E. L. ERICKSON  3,304,840
MEANS FOR SELECTIVELY OPERATING PLURAL WORKING MEMBERS
Filed Oct. 11, 1965  6 Sheets-Sheet 1
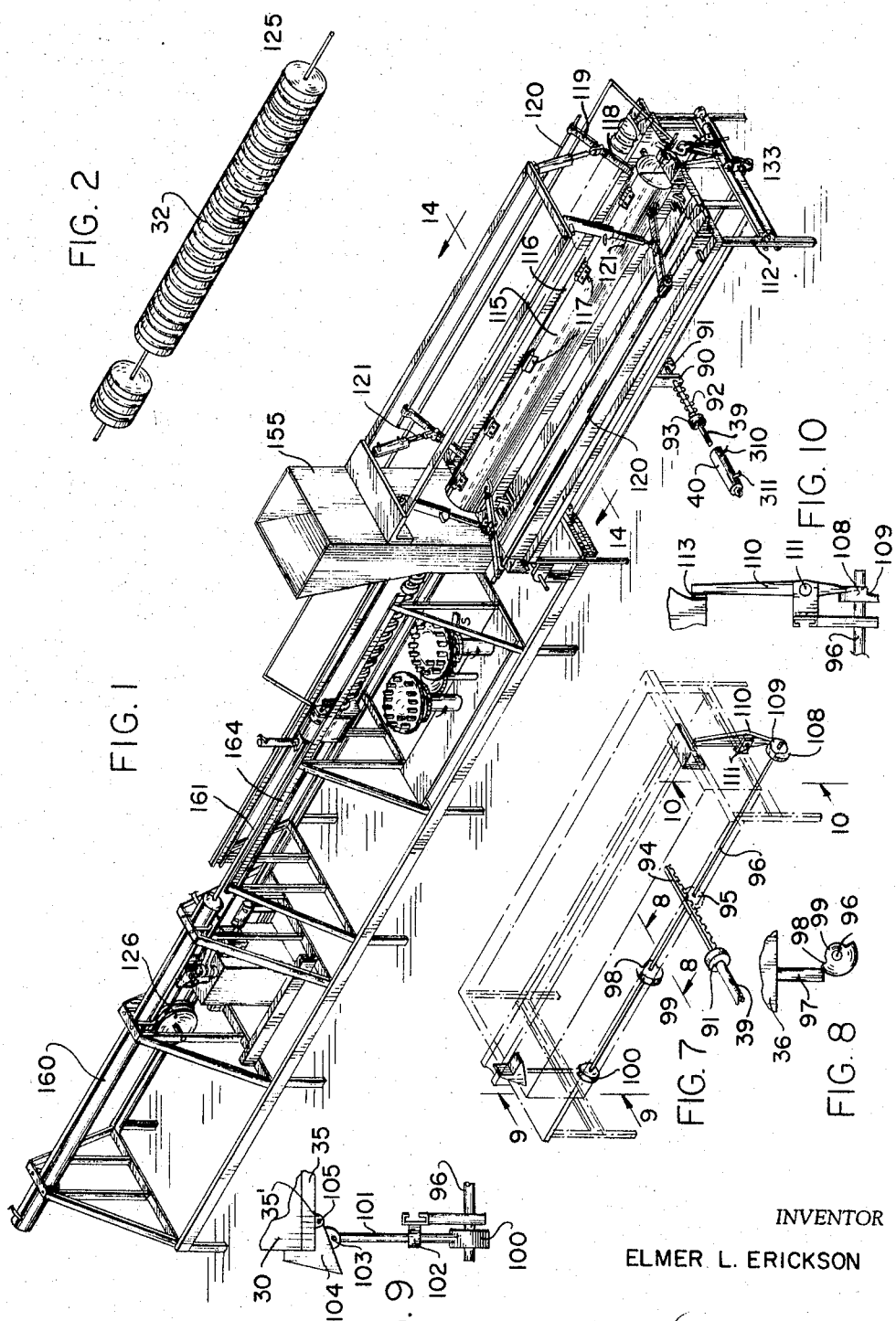
INVENTOR
ELMER L. ERICKSON
BY
ATTORNEYS

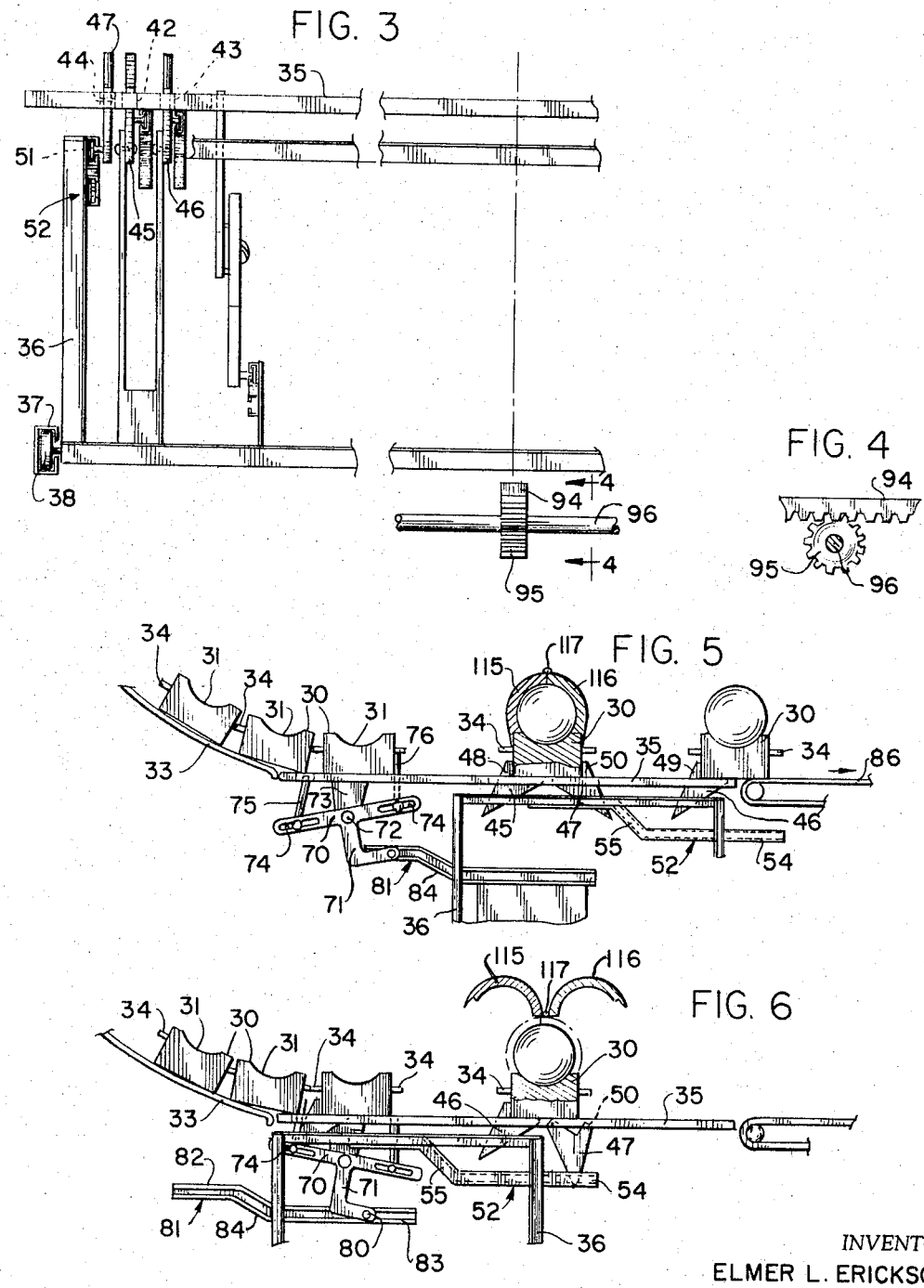

Feb. 21, 1967    E. L. ERICKSON    3,304,840
MEANS FOR SELECTIVELY OPERATING PLURAL WORKING MEMBERS
Filed Oct. 11, 1965    6 Sheets-Sheet 3
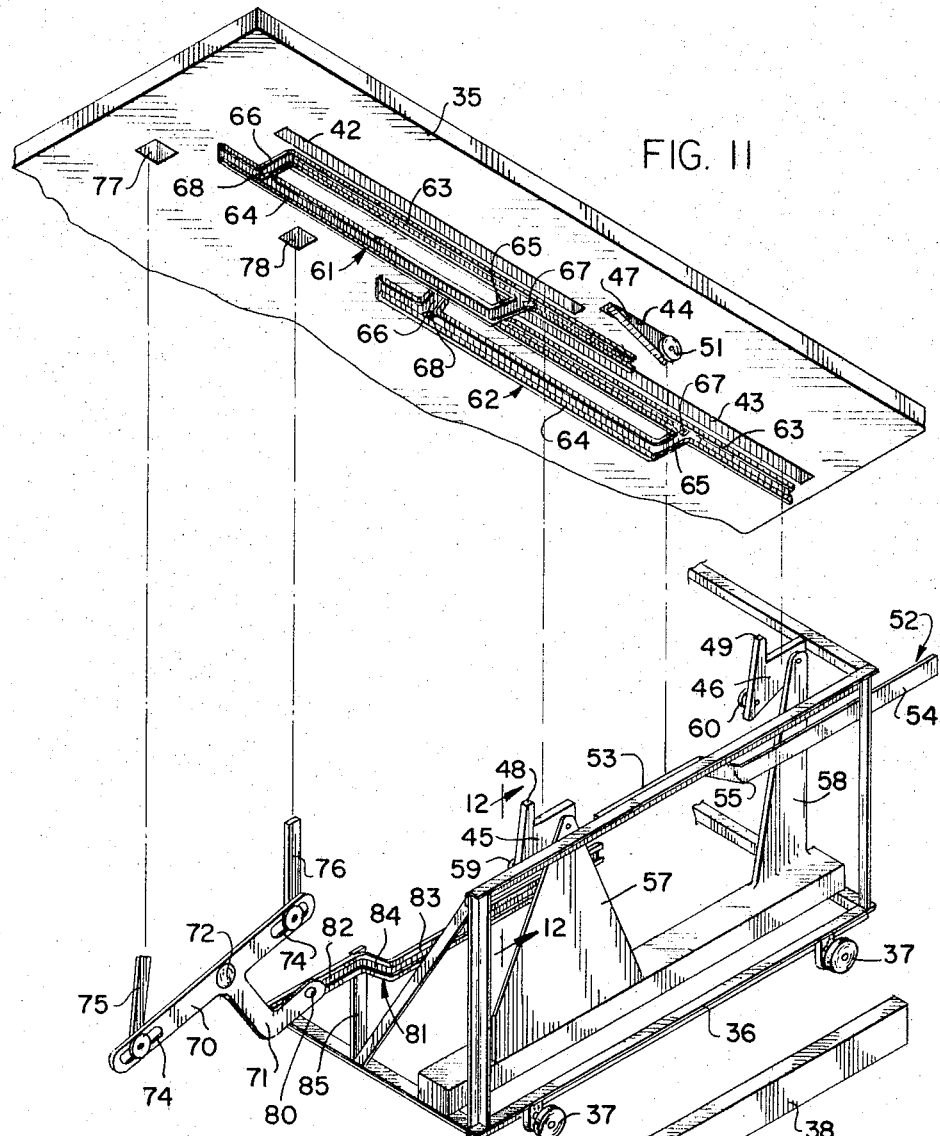
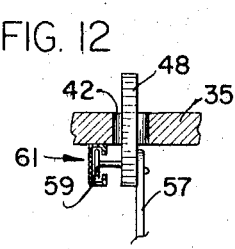
INVENTOR
ELMER L. ERICKSON
BY *[signature]*
ATTORNEYS

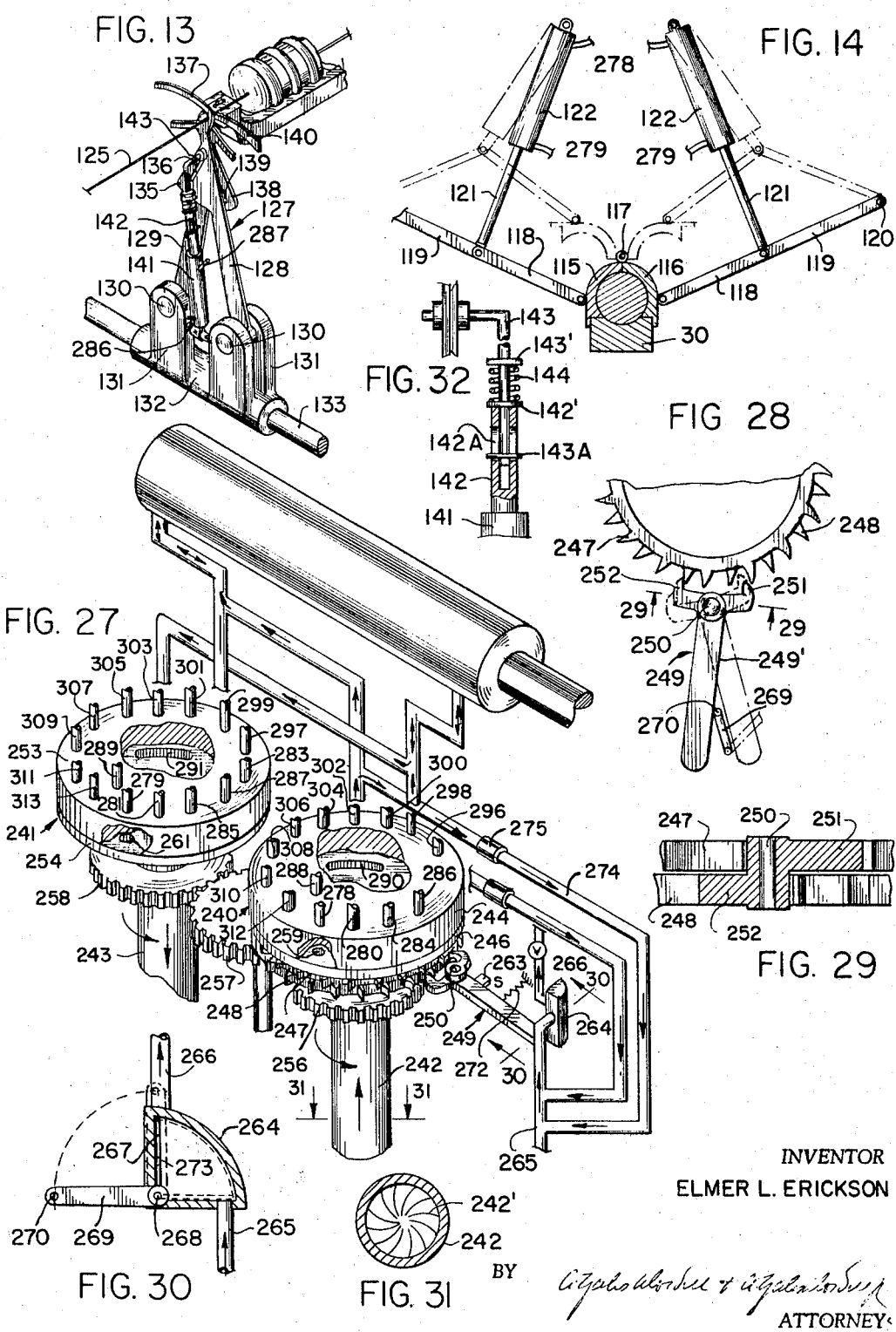

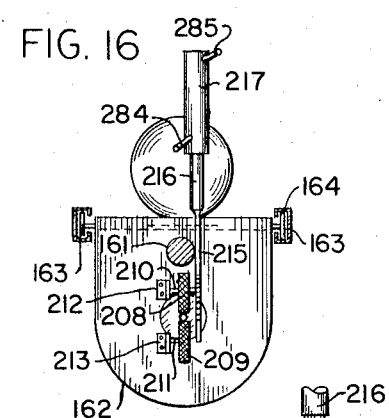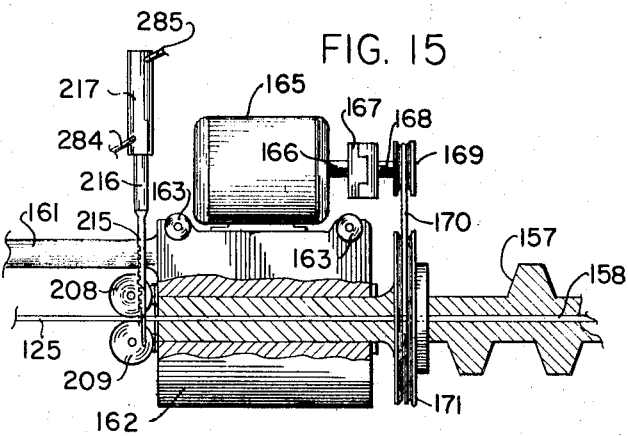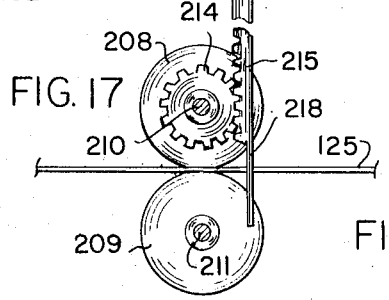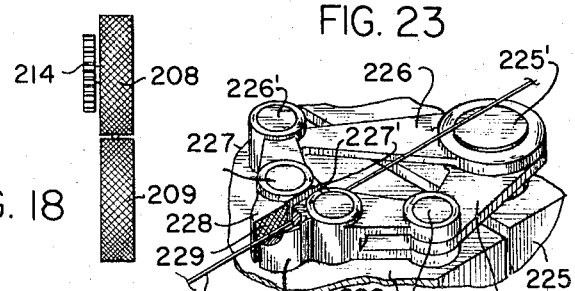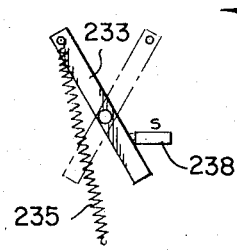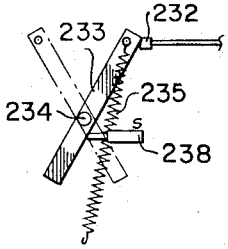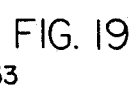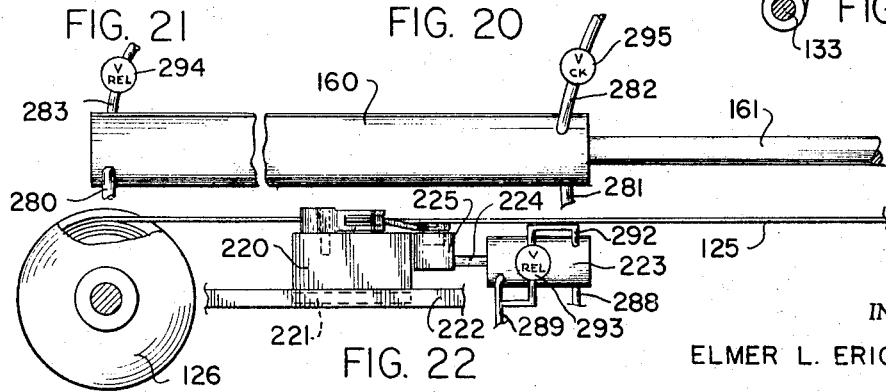

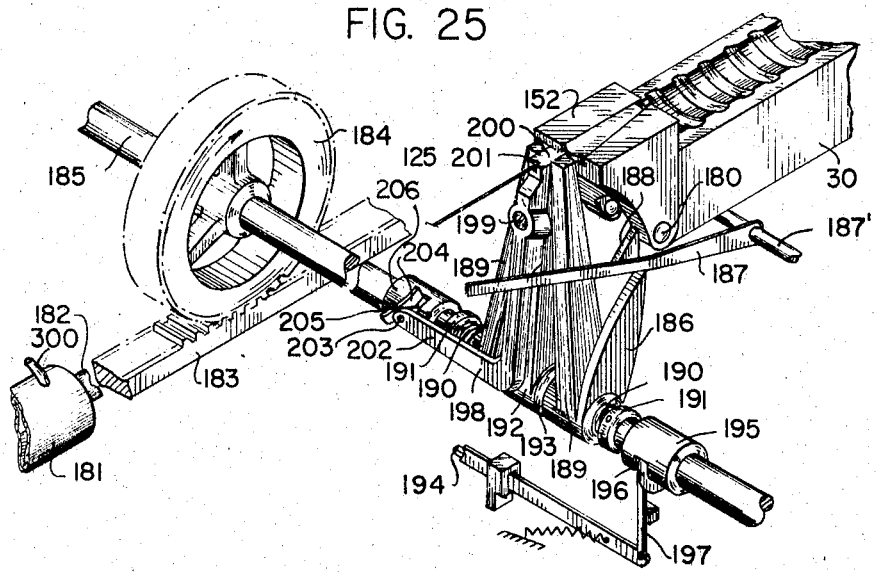

United States Patent Office 3,304,840
Patented Feb. 21, 1967

3,304,840
MEANS FOR SELECTIVELY OPERATING PLURAL WORKING MEMBERS
Elmer L. Erickson, 3435 7th Ave. S.,
Great Falls, Mont. 59401
Filed Oct. 11, 1965, Ser. No. 494,779
6 Claims. (Cl. 91—411)

This is a continuation-in-part of co-pending application Serial Number 230,873 filed October 10, 1962.

This invention relates to the manufacture of various articles, to the stressing of such articles and to the method and apparatus utilized to impart and to maintain such stress during the entire fabrication period.

The invention relates particularly to apparatus for producing concrete articles in plastic form and to structure for applying tension to a wire and forming the articles about such wire as well as the maintaining of tension on the wire until such time as the concrete has hardened.

Heretofore, many attempts have been made to fabricate prestressed concrete articles but such attempts have not met with any degree of success due to the length of time required to construct each article as well as the amount of labor required and the inherent costs involved. Also, prior devices have not been able to apply and maintain a constant stress to each article during the fabrication and subsequent drying periods thereof.

It is an object of the invention to provide a prestressed concrete article having a length of wire which is placed under tension prior to the application of concrete and is maintained in a stressed condition during the applying of the concrete and the drying thereof.

Another object of the invention is to provide a machine for continuously and automatically producing prestressed concrete articles in a minimum of time and with minimum effort.

A further object of the invention is to provide a method and apparatus for automatically extending a wire through a mold, securing the free end of the wire to the mold, applying a predetermined tension to the wire, filling the mold with concrete, securing the wire to the opposite end of the mold, severing the wire exteriorly of the mold and moving the mold to a place to be dried.

A still further object of the invention is to provide apparatus including an auger for filling a mold with concrete or the like in which such auger is adapted to move lengthwise into the mold and to be withdrawn from the mold after the filling process has been completed.

Still another object of the invention is to provide an automatically operated fluid system for operating a plurality of elements to perform various functions simultaneously and sequentially.

Still another object of the invention is to provide a fluid system having an input distributor and a discharge distributor each of which has movable portions which are rotated in timed relation to simultaneously and sequentially direct fluid under pressure to one or more elements and to discharge fluid from said elements to a reservoir.

Other objects and advantages of the invention will be apparent from the following description taken in conjunction with the accompanying drawings wherein:

FIG. 1 is a perspective illustrating apparatus for automatically producing prestressed concrete objects;

FIG. 2, a perspective of a prestressed concrete post produced in accordance with the present invention;

FIG. 3, an enlarged fragmentary side view of the pallet supporting platform and its associated structure;

FIG. 4, a fragmentary detail section on the line 4—4 of FIG. 3;

FIG. 5, a fragmentary end view of FIG. 3 showing the pallet moving carriage in one position;

FIG. 6, a view similar to FIG. 5 illustrating the carriage in another position;

FIG. 7, a perspective illustrating the carriage stop mechanism and the pallet aligning mechanism;

FIG. 8, an enlarged fragmentary section taken along the line 8—8 of FIG. 7;

FIG. 9, an enlarged vertical section taken along the line 9—9 of FIG. 7;

FIG. 10, an enlarged vertical section taken along the line 10—10 of FIG. 7;

FIG. 11, an enlarged fragmentary exploded perspective of the carriage and the pallet supporting platform;

FIG. 12, an enlarged fragmentary detail section taken along the line 12—12 of FIG. 11;

FIG. 13, an enlarged perspective of the wire clamping device at one end of the machine;

FIG. 14, an enlarged fragmentary section taken along the line 14—14 of FIG. 1;

FIG. 15, an enlarged fragmentary side elevation of the auger carriage;

FIG. 16, an end elevation of the structure of FIG. 15;

FIG. 17, an enlarged side elevation of the wire extending and retracting mechanism;

FIG. 18, an end elevation of the structure of FIG. 17;

FIG. 19, a side elevation of the wire clamping device of FIG. 13;

FIG. 20, a schematic of the clutch operating lever;

FIG. 21, a view similar to FIG. 20 showing the clutch lever in operative position;

FIG. 22, an enlarged fragmentary side elevation of the wire reel and the tension applying device;

FIG. 23, an enlarged perspective of the gripping jaws of the tension applying device;

FIG. 24, an enlarged fragmentary section of the hopper and auger;

FIG. 25, an enlarged fragmentary perspective of the wire severing apparatus;

FIG. 26, an enlarged fragmentary plan view of one of the pallets showing the means for securing the wire to both ends of such pallet;

FIG. 27, a perspective of the hydraulic system distributing heads and a typical connection to one of the cylinders;

FIG. 28, an enlarged fragmentary plan view of the distributing head operating device;

FIG. 29, an enlarged fragmentary section taken along the line 29—29 of FIG. 28;

FIG. 30, an enlarged horizontal section taken along the line 30—30 of FIG. 27;

FIG. 31, an enlarged section on the line 31—31 of FIG. 27 illustrating the means for rotating the distributor heads; and FIG. 32, an enlarged fragmentary section of the piston rod cushioning means on the wire clamping device of FIG. 13.

Briefly stated the apparatus of the present invention comprises a plurality of pallets movable one at a time to a predetermined location for engagement with a hinged mold. A wire is placed in the mold and tension is applied to such wire after which a feed screw or auger fills the mold with concrete. During the filling of the mold the auger is moved out of the mold by the material and upon completion of the filling operation, the wire is clamped to the pallet while still under stress. The wire is then severed exteriorly of the mold, the hinged portions of the mold are removed and the pallet with the completed post is moved to a curing area. An automatically operated fluid system is provided having input and discharge distributor heads which are rotated in timed relation to each other to operate a plurality of elements simultaneously and sequentially so that the machine will complete a prestressed concrete article without human supervision.

With continued reference to the drawings, a series of individual pallets 30 having a recessed upper portion 31 are provided which form part of the mold used in the fabricating of concrete articles such as posts 32. Such pallets are mounted for lateral movement on a slide or endless belt 33 and each of the pallets has spacing projections 34 extending outwardly from the sides to maintain a space between contiguous pallets.

The pallets are discharged from the endless belt 33 onto a table or platform 35 and moved to a predetermined position thereon. In order to move the pallet on the platform 35, a carriage 36 is disposed therebeneath and such carriage has rollers 37 mounted in tracks 38 for lateral movement of the carriage. The lateral movement of the carriage is controlled by a piston rod 39 operated by an hydraulic cylinder 40.

The platform 35 has a pair of slots 42 and 43 which are offset relative to each other and an elongated opening 44 adjacent each of its lateral edges in which hinged hooks 45, 46 and 47 respectively are adapted to operate. The hooks 45, 46 and 47 are generally triangular in shape and have lugs 48, 49 and 50 respectively which project upwardly from one corner. The hooks 47 are pivotally mounted at a second corner to the platform in such a manner that the lugs 50 project upwardly through the openings 44 and terminate above the upper surface of the platform 35 when such hooks are raised and are disposed below the upper surface of the platform when lowered. A roller 51 (FIGS. 3 and 11) is mounted on the third corner of the hook 47 and such roller is received within a track 52 supported by the carriage 36. The track 52 has an upper portion 53, a lower portion 54 and an inclined intermediate connecting portion 55.

When the carriage is in the position illustrated in FIG. 5, the roller 51 is located in the upper portion 53 of the track and the lug 50 projects above the platform 35 to stop lateral movement of a pallet. Upon movement of the carriage to the left as illustrated in FIG. 6, the roller 51 will move down the incline 55 onto the lower portion 54 and retract the lug to a position below the platform to permit the pallet to be moved.

In order to move the pallet, the hooks 45 and 46 are pivotally mounted at a second corner on upright members 57 and 58 respectively of the carriage 36. Rollers 59 and 60 are mounted on the hooks 45 and 46 respectively at the third corner thereof and such rollers are received within tracks 61 and 62 connected to the platform 35 and depending therefrom.

Tracks 61 and 62 are substantially identical and each has an upper portion 63, a lower portion 64, a downwardly inclined portion 65 and an upwardly inclined portion 66. A spring loaded gate 67 is located in the upper portion 63 adjacent to the downwardly inclined portion 65 and such gate is normally biased upwardly. A second spring loaded gate 68 is located in the lower portion 64 adjacent to the portion 66 and such gate is normally biased downwardly.

When the carriage is moved to the left as viewed in FIGS. 5 and 11 the rollers 59 and 60, which are in the rearmost portion of the upper portion 63, will move to the left until they strike gates 67 which will cause them to move down the inclines 65 to the lower portions 64 to retract the lugs 48 and 49 to a position below the upper surface of the platform 35. The rollers will then move forwardly and pivot the gates 68 out of the way so that the rollers can move to the forwardmost portion of the lower portions 64.

Upon the reversing of the direction of travel of the carriage, the rollers will engage the gates 68 and move up the inclined portion 66 to again cause the lugs 48 and 49 to project above the platform 35. Further movement of the carriage will move the rollers 59 and 60 rearwardly along the upper portions 63 until they engage the gates 67 and pivot such gates downwardly to form a bridge over the inclined portions 65 and prevent the rollers from falling by gravity down such inclined portions. During the rearward travel of the carriage and the hooks 45 and 46 carried thereby, the lugs 48 and 49 of such hooks will project upwardly above the platform 35. The lugs 49 will engage the pallet 30 which has been filled and the lug 48 will engage a new pallet. At the time that the lugs 48 and 49 engage the pallets, hook 47 will have retracted below the platform and the carriage is free to move rearwardly and to move the filled pallet out of position while simultaneously moving an empty pallet into filling position. Before the empty pallet has reached the filling position, hook 47 will have been raised so that the lug 50 will provide a stop to locate the empty pallet in filling position.

A pallet release assembly is provided for operation by the movement of the carriage 36. This assembly includes a toggle bar 70 having an L-shaped leg 71 depending from one side. The bar 70 is pivotally supported by a pin 72 on a support plate 73 depending from the platform 35. The bar 70 has a slot 74 adjacent to each of its free ends and one of such slots slidably receives one end of an arm 75 and the other slot slidably receives one end of an arm 76. The free ends of the arms 75 and 76 project upwardly through guide openings 77 and 78 in the platform 35 and are arranged in such a manner that when retracted the free ends will be located below the upper surface of such platform.

In order to move the bar 70 about the pivot 72, the free end of the L-shaped leg 71 has a roller 80 rotatably mounted on a fixed shaft and such roller is received within a track 81 having an upper portion 82, a lower portion 83 and an intermediate inclined connection portion 84, the track 81 being mounted on the carriage 36 by supports 85. When the carriage is in the position illustrated in FIG. 5, the bar 70 is inclined so that the arm 75 is retracted and the arm 76 is extended to limit the downward movement of the series of pallets 30.

After a pallet has been filled, the carriage is moved toward one side of the platform 35 at which time the hooks 45, 46 and 47 are retracted below the level of the platform 35. During the movement of the carriage the roller 80 which has been in the upper portion 82 of the track 81 will engage the inclined portion 84 and move downwardly onto the lower portion 83. This movement causes the bar 70 to be inclined in the opposite direction so that the arm 75 will project above the platform 35 and the arm 76 will be retracted therebelow. In this position the arm 75 will be disposed in front of the second pallet and the first pallet will be free to move.

When the direction of travel of the carriage is reversed, the hooks 45 and 46 will be raised above the level of the platform 35 and the lug 49 on the hook 46 will engage the pallet which has been filled and the lug 48 on the hook 45 will engage the pallet which has just been released by the arm 76. Continued movement of the carriage will move the filled pallet onto an endless belt 86 where it is moved to a remote position to be dried and will move the pallet released by the arm 76 into a position to be filled. As the carriage is returned to its original position, the roller 80 will again move to the upper portion 82 of the track 81 and reverse the position of the arms 75 and 76 and permit the series of pallets to gravitate down the belt or slide 33 until further progress is blocked by the arms 76.

The piston rod 39 controlled by the cylinder 40 to operate the carriage 36 is slidably received within a lug 90 depending from the carriage 36 and is provided with a collar 91 on one side of such lug to move the carriage in one direction when the piston rod is retracted. An over-riding spring 92 is located about the piston rod 39 on the opposite side of the lug 90 and such spring is confined between the lug 90 and a collar 93 to move the carriage when the piston rod is extended. The free end of the piston rod 39 is provided with a rack 94 which engages a pinion 95 fixed to a longitudinal shaft 96 located beneath the carriage.

In order to stop the carriage, a lug 97 (FIG. 8) depending from the carriage 36 engages the raised portion 98 of a cam 99 carried by the shaft 96 and temporarily halts the carriage in a position whereby the pallet 30 which is being moved into position to be filled will be closely adjacent to the lug 50 of the hook 47. At this point the piston rod 39 continues to move in the same direction and since further movement of the carriage is blocked, the piston rod will overcome the tension of the spring 92 and the rack 94 will engage the pinion 95 and rotate the shaft 96.

As illustrated in FIGS. 7 and 9 a cam 100 is fixed to one end of the shaft 96 and such cam is in engagement with a rod 101 slidably mounted for vertical reciprocation within a bearing 102 and the upper end of such rod is connected by a pivot 103 to a hook 104. The hook 104 is generally triangular in shape and is pivotally mounted at one corner by a pin 105 to a pair of ears 35' depending from the platform 35 and when the shaft 96 is rotated, the cam 100 will cause the rod 101 to raise the hook 104 and provide a fixed stop against which the pallet 30 is adapted to be moved. In order to move the pallet against the hook 104, the opposite end of the shaft 96 is provided with a cam 108 (FIGS. 7 and 10) having an outwardly disposed cam surface 109 which engages one end of a toggle or lever 110. Such lever is pivotally mounted by a pin 111 to supporting structure 112 of the platform 35 and the upper end of such lever is provided with a buffer spring 113 which engages the end of the pallet and provides a spring cushion so that the force exerted against the pallet is no greater than that necessary to seat the pallet against the hook 104 when the lower end is forced outwardly by the cam surface 109. Continued rotation of the shaft 96 will move the raised portion 98 away from the lug 97 and permit the spring 92 to move the carriage against the hooks 47.

When the pallet 30 is thus positioned, a pair of upper mold members 115 and 116 hingedly connected at 117 are swung into position over the top of the pallet 30. This is accomplished by pivotally connecting an arm 118 to each end of each of the mold members 115 and 116 and such arms are pivotally connected to arms 119 which in turn are supported by rods 120. The arms 118 and 119 provide a toggle connection and such connection is controlled by piston rods 121 operated by hydraulic cylinders 122. As illustrated in FIG. 14 the members 115 and 116 are closed about the pallet 30 as shown in full lines with the arms 118 and 119 fully extended. When the piston rods 121 are retracted as illustrated in phantom the members 115 and 116 will be opened to permit a filled pallet to be removed and a new pallet to be inserted in its position.

After the mold has been assembled a wire 125 carried by a reel 126 supported on a frame at the rear of the machine is passed through the mold as will be described later, and held by a wire holding mechanism 127 illustrated in FIG. 13. The wire holding mechanism 127 comprises a pair of scissors-like members 128 and 129 pivotally mounted at their lower ends by pins 130 to brackets 131 fixed to a sleeve 132 which is rotatably mounted on a shaft 133 carried by the supporting structure 112. The upper end of the member 128 is provided with a triangular shaped plate 135 having a slot 136 and such plate has a C-shaped clamp 137. The upper end of the member 129 is provided with a similar plate 138 having a slot 139 and a C-shaped clamp 140 in opposed relation to the clamp 137.

In order to operate the scissors-like members 128 and 129 an hydraulic cylinder 141 is mounted between the brackets 131 and has a piston rod 142, the upper end of which is hollow and is adapted to telescopically receive one end of an L-shaped pin 143. The upper end of the pin 143 extends forwardly substantially normal to the direction of travel of the piston rod and the forwardly projecting portion passes through the slots 136 and 139 so that when the piston is extended, the upward movement of the pin 143 will cause the C-shaped clamps 137 and 140 to move toward each other and clamp the wire 125. After the wire has been clamped, tension is applied to the wire from the opposite end of the apparatus in a manner which will be described later and such tensioning moves the wire holding mechanism 127 from a slightly inclined position as illustrated in full lines in FIG. 19 to a substantially vertical position as shown in phantom.

In order to compensate for the movement of the clamps 137 and 140 and to prevent any possibility of loss of contact with the wire during such movement, a reserve source of power is supplied between the piston rod 142 and the pin 143. This source of power comprises a spring 144 retained between a flange 143' carried by the pin 143 and a flat 142' carried by the piston rod 142. The pin 143 extends downwardly into the hollow portion of the piston rod 142 and is provided with a guide pin 143A slidably received within a slot 142A located in the piston rod 142. The guide pin 143A normally will be located at the upper extremity of the slot 142A due to the tension applied by the spring 144. When the piston rod 142 is extended, the pin 143 will close the C-shaped clamps 137 and 140 by moving up the slots 136 and 139 and when the pin has moved up the slots a distance sufficient to close the C-shaped clamps, the piston rod 142 will overcome the tension of the spring 144, and maintain a gripping action of the clamps on the wire under a predetermined stress. Any loss of gripping action by the clamps during subsequent movement of the wire holding mechanism 127 will be compensated for by the tension of the spring 144.

When the wire holding mechanism 127 is moved from an inclined to a vertical position, it will strike a wedge 145 (FIG. 26) slidably mounted in a groove 146 in a projection 147 at one end of the pallet 30 to clamp the wire between the wedge and the projection. The wedge 145 is maintained within the groove by a bolt or pin 148 projecting downwardly through a slot 149 in the wedge 145 and with such slot being substantially parallel to the tapered edge of such wedge. The opposite end of the pallet 30 is provided with a similar wedge 150 located in a groove 151 within a projection 152 for clamping the opposite end of the wire after the mold has been filled.

In order to fill the mold with concrete or the like, a hopper 155 is provided which is filled with concrete material in plastic form and in the bottom of which is located a sleeve 156 which in turn carries an auger 157 for moving the material from the hopper into the mold. This is accomplished by extending the sleeve 156 from a position within the hopper as illustrated in full lines in FIG. 24 to the position illustrated in phantom in which the sleeve bears against one end of the mold. The auger 157 has a central opening 158 extending the full length thereof and such opening provides a passage from the wire 125. After the sleeve 156 has been extended the auger is moved into the mold by an hydraulic cylinder 160 having a piston rod 161 connected at its free end to a platform 162. Such platform has rollers 163 mounted for longitudinal movement within tracks 164.

The platform 162 supports a motor 165 (FIG. 15) having a shaft 166 on which is mounted a clutch 167. The opposite side of the clutch is provided with a shaft 168 on which a pulley 169 is mounted and such pulley is adapted to drive a belt 170 which extends downwardly about a pulley 171 attached to the auger 157. When the clutch is engaged, the motor will rotate the pulley 169 to drive the pulley 171 and cause the auger 157 to remove material from the hopper 155 and to pass such material through the sleeve 156 into the mold. The rotating of the auger packs the material into the mold and when such material is packed tightly therein, the auger will bear against such material and will be forced out of the mold.

As the auger moves out of the mold against the resistance offered by the cylinder 160, such auger will move the platform 162 rearwardly until the mold is completely filled. When the mold has been filled, the clutch 167 will be disengaged to prevent further rotation of the auger and the sleeve 156 will be retracted into the hopper by an arm 172 connected at one end to the sleeve 156 and provided with a hook 173 at its opposite end which engages the platform 162. Further movement of the platform 162 in the same direction by the cylinder 160 will retract the sleeve 156 into the hopper. In order to return the sleeve to its extended position, the arm 172 has a reduced portion 174 on its outer end and such reduced portion is supported by a bearing 175 mounted on the fixed structure of the machine. A coil spring 176 is located about the reduced portion intermediate the bearing 175 and the arm 172 so that when the platform 162 is again extended by the piston rod 161, the tension of the spring 176 will extend the sleeve 156.

After the sleeve 156 has been retracted, it is necessary to clamp the wire at the filling end of the mold. In order to do this, the projection 152 is hinged by a pin 180 to the end of the pallet 130. The projection 152 is adapted to be pivoted upwardly by a wire anchoring mechanism that includes an hydraulic cylinder 181 having a piston rod 182 on the free end of which is fixed a rack 183 which meshes with a gear 184 mounted on a transverse shaft 185. When the piston rod 182 is extended, the rack 183 will turn the gear 184 and shaft 185 to rotate a cam 186 mounted on one of a pair of arms 189 and such cam bears against an arm 187 pivotally mounted on a shaft 187' and having a projection 188 adapted to engage the projection 152 and raise such projection into position. The arms 189 are pivotally mounted on the shaft 185 in alignment with the pallet 30 and such arms are connected by torque springs 190 to collars 191 fixed to the shaft 185. A hammer 192 is pivotally mounted on the shaft 185 intermediate the arms 189 and is connected to such arms by a pair of springs 193.

When the shaft 185 is rotated the arms 189 are raised into contact with the projection 152 on the pallet 30, however the hammer 192 is retained in its lowermost position by a release latch 194. Continued rotation of the shaft 185 will apply additional pressure on the arms 189 through the medium of the springs 190. During this continued rotation a sleeve 195 fixed to the shaft 185 and having a hinged cam 196 will operate a toggle lever 197 to release the latch 194 and permit the hammer 192, under tension of springs 193, to strike the wedge 150 and force the wire 125 into binding relation with the wedge 150.

With this action the wire 125 is secured at both ends of the pallet 30 and it is necessary to sever the wire adjacent to the end thereof. This is accomplished by a wire cutter 198 connected by a pivot 199 to the hammer 192. If desired, the wire cutter 198 may be urged by a spring not shown to the position illustrated in FIG. 25. In order to cut the wire, the hammer 192 has a groove or notch 200 in its upper edge which is disposed on three sides of the wire when the hammer is raised and the wire cutter 198 has a corresponding groove or notch 201 substantially in alignment with the groove 200. The wire is adapted to be cut by pivotally moving the wire cutter 198 transversely of the wire to provide a shearing action between the wire cutter and the hammer 192. In order to pivotally move the wire cutter, such cutter 198 is provided with a leg 202 extending transversely substantially at a right angle thereto and such leg has an inwardly projecting pin 203 which engages a cam plate 204 hingedly mounted within a recess 205 in a sleeve 206 secured to the shaft 185.

After the wedge has been forced into binding relation with the wire, the shaft 185 will continue to rotate a short distance to permit the pin 203 to pivot the plate 204 downwardly within the recess 205 and pass thereover whereupon the plate 204 will be returned to its original position against the shoulder of the recess 205 by a spring (not shown). The cylinder 181 is then reversed and the rack 183 will move in the opposite direction which in turn moves the gear 184 and shaft 185 in the opposite direction. When the shaft 185 is rotated in the opposite direction, the cam plate 204 will engage the pin 203 and pivot the groove 201 across the groove 200 to sever the wire 125. During this first movement in a reverse direction, the springs 190 are being unwound and the hammer 192 and arms 189 are still in contact with the projection 152. Continued rotation of the shaft in the same direction will lower such hammer and arms to their initial position where the hammer will again be engaged by the latch 194.

When the wire has been severed the free end is adapted to be retracted into the opening 158 in the auger 157. This is accomplished by a pair of wheels 208 and 209 having knurled or serrated edges rotatably mounted on pins 210 and 211 respectively which in turn are carried by brackets 212 and 213 mounted on the platform 162. The wheel 208 has a gear 214 connected thereto at one side and such gear meshes with a rack 215 mounted on the end of a piston rod 216 operated by an hydraulic cylinder 217. The rack 215 has a flattened portion 218 normally located adjacent to the teeth of the gear 214 to permit free rotation of the wheels 208 and 209 so that the platform 162 can move relative to the wire 125 when the auger is being withdrawn from the mold. After the wire has been severed, the cylinder 217 is energized to extend the piston rod 216 and cause the rack 215 to engage the teeth of the gear 214 to positively drive the wheel 208. The wheel 208 is in frictional contact with the wire 125 and such wire is in contact with the wheel 209 so that when the wheel 208 is rotated by the rack 215, the wheel 209 is likewise rotated to retract the wire 125. The wheels 208 and 209 will remain in contact with the wire 125 during the time that the auger 157 is being inserted into the mold. The gripping action of such wheels will pull the wire from the coil 126 and after the auger has been completely inserted within the empty mold, the direction of travel of the piston rod 216 and its associated rack 215 is reversed to cause the wheels 208 and 209 to extend the wire through the end of the mold in a position to be clamped by the C-shaped clamps 137 and 140.

When the wire has been clamped by the wire holding mechanism 127 at one end of the machine, tension is adapted to be applied at the opposite end to place the wire under a predetermined stress. In order to do this a carriage 220, mounted on slide blocks 221 received in tracks 222, is located adjacent to the reel 126 at the rear of the machine and is movable longitudinally thereof. A moving force for the carriage 220 is in the form of an hydraulic cylinder 223 having a piston rod 224 with a block 225 mounted on the free end thereof. Such block is provided with an upwardly projecting stub shaft 225' about which a pair of upwardly inclined arms 226 are rotatably mounted. The free ends of each of the arms 226 are hingedly connected by a pin 226' to a jaw 227. Each of the jaws 227 is pivotally mounted by a pin 228 mounted on the carriage 220. Each of the jaws 227 has a knurled wire engaging face 229 on its end opposite the hinge so that when the piston rod 224 is extended, the arms 226 will cause the jaws 227 to pivot about the pins 228 and move the knurled faces 229 into holding engagement with the wire. Upon continued movement of the piston rod, the carriage 220 will overcome the coefficient of friction and a predetermined stress will be applied to the wire which will be maintained until after the mold has been filled and the wedge 150 has been forced into binding relation with the wire. The pressure on the jaws 227 is relieved before the wire cutter 198 is actuated.

If desired, the jaws 227 may have stops 227' to limit the movement of such jaws when the piston rod 224 is retracted. When the cylinder 223 is actuated to close the jaws 227, the initial rearward movement of the wire will pull the wire holding mechanism 127 from the angular position as illustrated in full lines in FIG. 19 to a vertical position as shown in phantom. As the wire holding mechanism is pulled to the vertical position, it will strike a knob 230 fixed to one end of a rod 231 and move such rod rearwardly. A knob 232 is connected to the opposite end of the rod 231 and when the rod 231 is moved rearwardly, the knob 232 will engage a lever 233 pivotally mounted on a pin 234 and having a spring 235 connected to the upper portion of the lever 233 so that when such lever moves past the top dead center the spring 235 will exert a downward force and cause the lever to assume the position illustrated in FIG. 21. In this position the lever 233 will cause the clutch 167 to be engaged so that the motor 165 can rotate the auger 157 through the belt 170. The lower end of the lever 233 is connected to a solenoid 238 and such solenoid is electrically connected to the clutch mechanism so that upon the completion of the filling of the mold the solenoid 238 is energized to return the lever 233 to the position shown in FIG. 20 and cause the clutch to be disengaged.

With particular reference to FIGS. 27–30 an hydraulic system is schematically illustrated for operating all of the hydraulic cylinders of the system in the proper sequence from a single source. This system includes an input distributor head 240 and a discharge distributor head 241. The input distributor head 240 is provided with fluid from a source not shown through a central column 242 and the discharge distributor head is provided with a column 243 for returning the fluid to the reservoir. The input distributor head has a fixed upper plate 244 in which a plurality of hydraulic pressure lines are located and a lower member 246 mounted on the central column 242 with such central column being rotatable by a series of impeller blades 242' which are constantly being subjected to the pressure of the fluid from the high pressure pump of the system to cause rotation of the distributor heads 240 and 241. The lower rotatable member has a pair of toothed upper and lower rings 247 and 248 secured thereto and such rings are under the influence of an escapement 249 pivotally mounted on a pin 250 to the supporting structure of the device.

The escapement is provided with a pair of fingers or hooks 251 and 252 which are offset from each other in a horizontal plane, as illustrated in FIG. 29, so that the hook 251 engages the toothed ring 247 when the escapement is in the position shown in phantom in FIG. 28 and the hook 252 engages the toothed ring 248 when the escapement is in the position shown in full lines. The escapement is normally in the position shown in phantom in FIG. 28 with the hook 251 engaging one of the teeth of the ring 247 to prevent rotation of the lower member 246.

The discharge distributor head 241 has a fixed upper plate 253 and a rotatable lower member 254. The plate 253 has a plurality of equally spaced fluid returned lines with one of such return lines being connected to each cylinder of the system. The lower member 246 o fthe input distributor head 240 is connected to a gear 256 which meshes with an idler gear 257 which in turn meshes with a gear 258 mounted on the lower plate 254 of the discharge head 241 so that the lower members 246 and 254 are synchronized to move simultaneously. The lower member 246 is provided with an opening 259 which will be aligned with one of the hydraulic pressure lines at each step of such lower member, and the lower member 254 has an opening 261 which will be aligned with one of the return lines at each step of such lower member.

The escapement 249 is adapted to be moved by a solenoid 263 or by a fluid gate valve 264 to operate the lower members 246 and 254. In order for the fluid gate valve 264 to move the escapement, such valve is provided with an inlet manifold 265 by which fluid is introduced into the valve 264 and a discharge line 266 for permitting the escape of fluid within the valve. The valve 264 has a gate 267 mounted on a shaft 268 so that when the fluid is introduced through the manifold 265, the gate 267 will move from the position shown in phantom in FIG. 30 to the position shown in full lines to permit the fluid to escape through the line 266.

An arm 269 is fixed to the shaft 268 exteriorly of the valve 264 and such arm has a depending pin 270 on its free end which pin engages one side of a rearwardly extending lever 249' on the escapement 249. When the gate 267 is moved, the pin 270 will bear against the lever 249' and will pivot the escapement 249 about the pin 250. To return the escapement 249 to its initial position, a spring 272 is connected to the lever 249' and when pressure is relieved on the manifold 265 such spring will return the escapement and move the gate 267 to the position shown in phantom in FIG. 30. The gate 267 is provided with a bleeder hole 273 to permit the fluid on one side of the gate to pass through to the other side when the spring is returning the escapement.

The solenoid 263 is capable of moving the escapement 249 independently of the arm 269 and when such condition occurs, the arm 269 and the gate 267 will remain in their inoperative position while the escapement is permitting the lower distributor head to move.

All but one of the hydraulic pressure lines has a bypass or relief line 274 leading from such line to the manifold 265. Each of the relief lines has a check valve 275 of the spring loaded ball type so that when the pressure within the hydraulic lines has moved the piston the required distance, pressure in the line will overcome the spring tension of the check valve and permit the fluid to flow through the relief lines into the manifold. When the pressure is applied to the manifold, the gate 267 will be moved and the movement of the gate will move the escapement so that the hook 251 will become disengaged from the tooth of ring 247 and the lower distributor head will be permitted to rotate substantially to the next station where the hook 252 engages the next succeeding tooth of the lower ring 248. The initial rotation of the lower distributor head will stop the flow of fluid through the pressure line and the by-pass line and when the hook 252 stops the rotation, fluid will be directed to the next succeeding pressure line of the system. When the flow of fluid to the by-pass line is cut off and the pressure on the manifold is relieved, the spring 272 will return the escapement to its original position. This movement of the escapement 249 will cause the hook 252 to become disengaged from the tooth of ring 248 and permit a slight further rotation of the distributor head until the hook 251 again engages one of the teeth of the ring 247.

A typical hydraulic arrangement is illustrated in FIG. 27 and when the opening 259 is in alignment with one of the hydraulic lines on the input distributor head 240, the opening 261 is in alignment with the corresponding return line and fluid will be forced through such lines to move the piston within the cylinder.

In the operation of the device, it will be assumed that a pallet has just been filled and removed from the apparatus and an empty pallet has been moved into position. The cylinders 122 which are connected to a pressure line 278 of the input distributor head 240 and to a discharge line 279 of the discharge head 241 will be activated to close the hinged mold portions 115 and 116 about the pallet 30. When such mold portions are closed, the piston rod 121 of the cylinders 122 will contact a positive stop (not shown) and escapement 249 will be activated by valve 264 to permit the input distributor head and the discharge distributor head to operate and direct fluid into a pressure line 280 and discharge line 281 to activate cylinder 160. Movement of the cylinder 160 extends the auger 157 into the mold and moves the sleeve 156 out of the hopper 155 and into contact with such mold. The cylinder 160 (FIG. 22) has additional hydraulic lines 282 and 283 for a purpose to be described later.

As soon as the auger and sleeve are in position, escapement 249 will be activated to permit the distributor heads 240 and 241 to move and direct fluid into cylinder 217 through pressure and discharge lines 284 and 285 respectively, which retracts piston rod 216 and rack 215 and extends the wire through the end of the mold. After the rack 215 has been retracted to a position where the flattened area 218 is adjacent to the gear 214 and the serrated wheels are free to rotate when the auger retracts, the escapement will be operated to permit distributor heads 240 and 241 to stop the flow of fluid to the cylinder 217 and to direct fluid to cylinder 141 through pressure and discharge lines 286 and 287 for operating the wire holding mechanism.

The fluid introduced into cylinder 141 will cause piston rod 142 to be extended and close the C-shaped clamps 137 and 140 about the wire 125. When the wire has been clamped, the piston rod 142 will continue its outward movement and apply tension to the spring 144 to maintain a predetermined gripping action of the clamps on the wire. The escapement 249 then will be activated to permit the distributor heads to stop the flow of fluid to cylinder 141 and direct fluid to the wire tensioning cylinder 223 through a pressure line 288 and a discharge line 289. Since the cylinder 223 must maintain a constant tension on the wire 125 for an extended length of time, the fluid lines 288 and 289 are not provided with bypass lines 274 and check valves 275. The fluid line 288 is in communication with an elongated opening 290 in the input distributor head 240 and the discharge line 289 is in communication with a corresponding elongated opening 291 in the discharge distributor head 241.

In order to maintain a constant tension on the wire 125 a second fluid line 292 will be connected to the cylinder 223 at the same end as the pressure line 288 and such fluid line 292 has a spring-loaded relief valve 293 which opens at a predetermined pressure to permit fluid to flow therethrough. The fluid line 292 is connected to the discharge line 289 so that when the cylinder 223 has applied a predetermined tension to the wire 125 the pressure within such cylinder will overcome the tension of the valve 293 and will permit the fluid to flow through the line 289 and back to a discharge distributor head 241. In this manner a predetermined tension will be maintained on the wire as long as the fluid line 288 is in communication with the elongated opening 290.

When the cylinder 223 is activated, the piston rod 224 will close the jaws 227 about the wire 125 and apply the strain thereon which will move the wire-holding mechanism 127 from an inclined position to a substantial vertical position. The movement of the wire-holding mechanism 127 to a vertical position will move the rod 231 against the lever 233 which activates the clutch 167 which in turn rotates the auger 157 and deposits concrete into the mold.

As the auger rotates it will be backed out of the mold by the material which it has deposited therein and such rearward movement causes the carriage 162 to move rearwardly and to retract piston rod 161 into the cylinder 160. The cylinder 160 is adapted to offer resistance to the rearward movement of the auger and the carriage by means of the hydraulic lines 282 and 283. Line 283 has a relief valve 294 which opens under a predetermined pressure and permits the fluid to flow through the discharge line 283 back to the discharge distributor head. In order to replace the fluid in cylinder 160 which has been discharged therefrom the line 282 will be connected to an overhead fluid supply reservoir (not shown) with a one-way balance check valve 295 intermediate the reservoir and the cylinder so that fluid can only travel in the direction from the reservoir to the cylinder.

When the mold has been filled a contact point on the clutch assembly will complete an electrical circuit to energize the solenoids 238 and 263. The solenoid 238 will move the lever 233 to the position shown in full lines in FIG. 20 to disengage the clutch 167 and stop the rotation of the auger 157 and simultaneously solenoid 263 will move the escapement 249 and permit the distributor heads 240 and 241 to rotate.

Upon movement of the escapement 249 fluid will again be directed to the cylinder 141 through pressure and discharge lines 296 and 297 which are connected to the discharge and pressure lines 287 and 286 respectively to cause the piston rod 142 to be retracted within such cylinder and cause the C-shaped clamps 137 and 140 to release their grip on wire 125 whereupon the wireholding mechanism will return to the inclined position illustrated in full lines (FIG. 19) through spring action.

When the piston rod 142 has reached the end of its effective stroke the relief valve 275 will open and cause the fluid gate valve 264 to operate the escapement 249 and permit the distributor heads 240 and 241 to rotate to the next position. In this position the cylinder 160 will again be activated through pressure and discharge lines 298 and 299 connected to the discharge and pressure lines 281 and 280 respectively to retract the auger and the telescoping sleeve into the hopper 155. At the completion of the stroke of the cylinder 160 the distributor heads will be operated so that fluid will be directed into the cylinder 181 through pressure and discharge lines 300 and 301 respectively which raises the projection 152 and secures the wire 125 to the projection by means of the wedge 150.

When the cylinder 181 reaches the end of its stroke, relief valve 275 will open to permit the introduction of fluid into the fluid gate valve 264, which operates the escapement 249 and permits the distributor heads 240 and 241 to stop the flow of the fluid to the cylinder 181. The fluid is then directed to the cylinder 223 through pressure and discharge lines 302 and 303 connected to discharge and pressure lines 289 and 288 respectively which reverses the direction of movement of the piston rod 224 and relieves the tension of the wire 125 after which the distributor heads are again operated to reverse the flow of fluid to the cylinder 181 through the lines 304 and 305 connected to discharge and pressure lines 301 and 300 respectively. Movement of the piston rod 182 in the reverse direction causes the wire 125 to be severed by the wire cutter 198 and the hammer and arms are returned to their lowered position and latched.

Next the distributor heads are rotated to direct the flow of fluid to the cylinder 217 through pressure and discharge lines 306 and 307 connected to discharge and pressure lines 285 and 284 respectively to extend the rack 215 and cause the wheels 208 and 209 to retract the free end of the wire into the opening 158 in the auger. At the completion of the stroke of the piston rod 216 the distributor heads will again be operated to direct fluid to the cylinders 122 through pressure and discharge lines 308 and 309 connected to discharge and pressure lines 279 and 278 respectively and retract piston rods 121 to open hinged mold portions 115 and 116.

After the mold has been opened, the distributor heads 240 and 241 are rotated to introduce fluid into the cylinder 40 through pressure and discharge lines 310 and 311 to retract the piston rod 39 and move the carriage 36 to the left as viewed in FIG. 5. At the end of the stroke the first pallet is released by the arms 76 and the distributor heads 240 and 241 are rotated to reverse the flow of fluid to the cylinder 40 through pressure and discharge lines 312 and 313 connected to the discharge and pressure lines 311 and 310 respectively and return the carriage to its initial position. The movement of the carriage and its associated mechanisms removes the pallet which has been filled and moves the pallet which has been released by the arm 76 to a predetermined position. When the pallet has reached its predetermined position the cylinder 40 will engage a positive stop whereupon the distributor heads will again be rotated to direct fluid to the cylinders 122 to close the hinge mold portions 115 and 116 about the pallet 30 and the entire sequence of operation will be repeated.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. In a device having multiple fluid cylinders for producing prestressed concrete articles, a fluid pressure system comprising an input distributor head having fixed and rotatable portions, a discharge distributor head having fixed and rotatable portions, a first series of fluid lines connected to at least certain of said fluid lines, whereby head, each line being connected at the opposite end to one of said cylinders, a second series of fluid lines connected at one end to the fixed portion of said discharge head, the opposite end of each of said second series of lines being connected to said cylinders, means providing selective communication between the fixed and movable portions of said input and discharge heads, means connecting said input head with a source of fluid under pressure, said discharge head being connected to a reservoir, and means for simultaneously rotating the rotatable portions of said input and discharge heads, whereby fluid under pressure will be directed to and discharged from certain of said cylinders and thereafter the rotatable portions of said input and discharge heads will be moved so that fluid will be directed to and discharged from certain other cylinders.

2. The structure of claim 1 in which said means for simultaneously rotating the rotatable portion of said input and discharge heads includes gearing connecting said rotatable portions.

3. The structure of claim 2 including at least one toothed ring carried by the movable portion of said input distributor head, an escapement engaging said toothed ring, and means for operating said escapement.

4. The structure of claim 3 in which said means for operating said escapement includes by-pass valve means connected to at least certain of said fluid lines, whereby said escapement will be operated when the fluid cylinder controlled by the fluid lines has completed its operation.

5. A fluid pressure system comprising multiple fluid cylinders, an input distributor head having fixed and movable portions, a discharge distributor head having fixed and movable portions, means for operating said movable portions simultaneously, means independently connecting each of said cylinders with the fixed portion of said input head, means independently connecting each of said cylinders with the fixed portion of said discharge head, each of said movable portions having an opening providing selective communication with at least one of said means connected to said cylinders, said input head being connected to a source of fluid under pressure, and said discharge head being connected to a fluid reservoir, whereby movement of said movable portions will operate said cylinders.

6. The structure of claim 5 including means for operating certain cylinders independently and certain cylinders simultaneously.

References Cited by the Examiner
UNITED STATES PATENTS

| | | | |
|---|---|---|---|
| 2,431,944 | 12/1947 | Lauck | 91—411 X |
| 2,671,433 | 3/1954 | Meddock | 91—457 X |
| 2,881,740 | 4/1959 | Ensinger | 91—457 |
| 2,919,680 | 1/1960 | Scharringhause | 91—411 |

MARTIN P. SCHWADRON, *Primary Examiner.*

EDGAR W. GEOGHEGAN, *Examiner.*

P. T. COBRIN, *Assistant Examiner.*